Jan. 7, 1958  R. M. CARRIER, JR  2,819,047
CONVEYOR FOR MIXING AND DE-AERATING
Filed Dec. 1, 1953

INVENTOR.
ROBERT M. CARRIER, JR
BY
Oberlin & Limbach
ATTORNEYS.

United States Patent Office 2,819,047
Patented Jan. 7, 1958

2,819,047

CONVEYOR FOR MIXING AND DE-AERATING

Robert M. Carrier, Jr., Louisville, Ky., assignor to Carrier Conveyor Corporation, Louisville, Ky., a corporation of Kentucky Application December 1, 1953, Serial No. 395,414

5 Claims. (Cl. 259—72)

The present invention relates generally as indicated to a conveyor for mixing and de-aerating, and more particularly to a vibrating conveyor of the "directional throw" type in which material supported thereon is conveyed by vibration of the conveyor trough or pan obliquely with respect to its material supporting surface, whereby the material is tossed forwardly and upwardly from the material supporting surface and is thereby conveyed.

It is one principal object of this invention to provide a unique form of conveyor trough or pan which is capable of rapidly and thoroughly mixing or blending together a plurality of materials of different compositions, forms, colors, etc.

It is another object of this invention to provide a unique form of conveyor trough or pan which, in addition to being effective to thoroughly blend or mix different materials, is capable, at the same time, of de-aerating and compacting fluffy materials so as to materially increase the conveying capacity of the conveyor.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Before explaining certain distinctive features of the present invention, it should be pointed out that in the ordinary vibrating conveyor, when a mat of comparatively dry granular material is conveyed by progressive throwing forward and upward with respect to the conveyor pan, said mat is separated from the supporting surface of the pan, and the void space under the mat becomes filled with air. In a conventional vibrating trough having upstanding parallel sides, if the mat of conveyed material consists of fine particles of low specific gravity, the in-rushing air will be trapped between the particles and they will be partially held in suspension. This condition is commonly known in the industry as a condition of "aeration." The effect of such aeration is threefold, viz:

(1) The bulk density of the material is reduced, and for a given depth of mat and conveying speed, the capacity of the conveyor in lbs./hr. is proportionately reduced;

(2) As a result of inter-particle slippage, the mean speed of conveying of the mat is substantially reduced, resulting in a further decrease of conveying capacity; and (3) The maximum depth of the mat which the conveyor can convey will be limited by the degree of aeration, this resulting from extreme slippage between the particles and caused by the inability of the lower particles to impart a directional conveying impulse to the upper particles.

Thus, it is apparent that, with the conventional conveying troughs having flat bottoms and upstanding parallel sides, the conveying capacity of the conveyor is greatly reduced when used for conveying fluffy materials such as baking flour and the like.

In the conventional vibrating conveyor, it is customary to provide a flat bottom surface, and as the mat of material is uniformly tossed forwardly and upwardly with respect thereto, no appreciable mixing action takes place, whereby if it be desired to mix a plurality of materials of the same composition but different particle size or form, or of different colors, or of different compositions, it is therefore necessary to employ other apparatus for such purpose.

Figure 1:
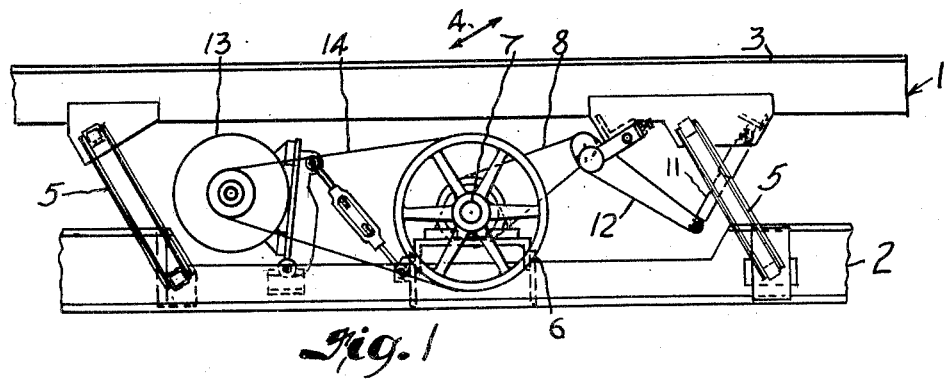
Fig. 1 is a side elevation view of a vibrating conveyor.

In Fig. 1 of the drawing there is illustrated a vibrating conveyor 1 which comprises a frame or base 2 and a conveyor trough 3 supported thereby for vibration along an oblique path as denoted by the line 4, such path in the present case being approximately 30° from horizontal, although such angle may be varied from nearly horizontal to nearly vertical.

Said trough 3 is resiliently mounted on springs 5 which extend between said trough 3 and said base 2, and vibration of said trough is effected as by means of an eccentric drive unit 6 which comprises an eccentric shaft 7 journalled on base 2 and a connecting rod 8 operatively connected to trough 3.

A conveyor 1, as illustrated in Fig. 1, is designed for operation at the natural frequency of its spring mounting and at a predetermined uniform amplitude, and for such purpose an extensible link in the form of a hydraulic shock absorber unit 11 and a link 12 are employed to provide a substantially positive drive of predetermined stroke at the natural frequency of say 500 cycles per minute, for example, and to allow gradual settling of the trough 3 under varying loads of conveyed material thereon.

Said link 12 is pivotally connected adjacent one end to said trough 3 and at the other end to an end of said unit 11, the connecting rod 8 being pivotally connected to said link 12 at such one end offset from the link 12-trough 3 connection. Thus, as the load on the conveyor varies, the link 12 will be swung about its connection to rod 8 to cause lengthening or shortening of the unit 11 without transmitting added load on rod 8 or drive unit 6, and at any settled position of the conveyor, the amplitude of vibration will remain substantially constant because, at 500 cycles per minute, for example, the unit 11 is, for all practical purposes, of a fixed length. It is to be understood that for the purposes of the present invention, the vibration of the trough 3 may be induced by means other than herein disclosed, and that the particular mechanism herein is to be regarded merely as typical. The pivotal connections aforesaid are preferably rubber-bushed. Furthermore, in instances where the amount of settling due to viriation in load is a minor fractional portion of the stroke or amplitude of vibration, the unit 11 and link 12 may be dispensed with, rod 8 being connected directly to trough 3, and such small amount of settling can be accommodated by a series of rubber bushings, or a rubber bushing in the drive linkage. The reference numeral 13 denotes the electric drive motor which, through belt 14, drives eccentric unit 6.

Figure 2:
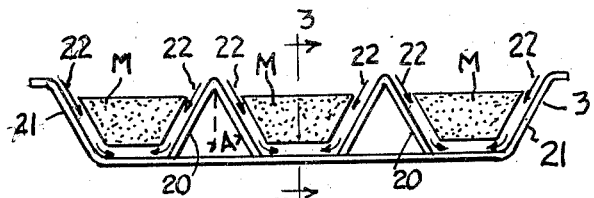
Fig. 2 is an end elevation showing the conveyed material thrown upwardly with respect to the material supporting surface of the conveyor trough.
Figure 3:
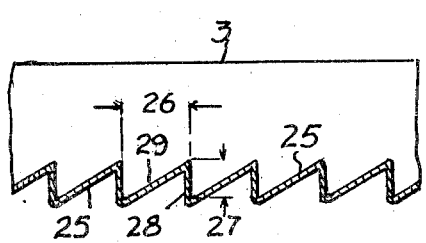
Fig. 3 is a longitudinal cross-section view taken substantially along the lines 3—3, Fig. 2.

As best shown in Figs. 2 and 3, the trough 3 is provided with de-aerating vanes 20 which, together with the sloping sides 21 of said trough, serve to divide the mat of conveyed material M into separate sections of wedge or trapezoidal cross-section shape of such proportions, as shown, that the width of the bottom of each section is comparatively narrow with respect to the width of the top of each section, for example nearly 1:2 or less. The maximum width of the bottom of each section for any particular material to be conveyed will be in inverse ratio to its tendency to aerate; or, in other words, the finer the particle size and the lighter its specific gravity and also the closer the individual particles tend to be spherical, the smaller the width of the bottom must be with respect to the width of the top. The slope (angle A) of the sides of the de-aerating vanes 20 and of the sides 21 of the trough is not extremely critical and may be varied without substantial change in results between 30° and 70°.

The practical result with the de-aerating vanes 20 and sloping sides 21 is that, when the wedge-shaped mats of material M are thrown upwardly and forwardly from the bottom surface of the conveyor trough 3, the air or other gas around the conveyor and in contact with the top surface of the mat flows around the wedge-shaped sections M, as represented by arrows 22, rather than through the mat sections as would be the case if the conveyor had parallel upstanding side portions and a wide, flat bottom surface. This flowing of the air or other gas around the mat sections M greatly reduces the tendency for them to become aerated, thereby resulting in a greater conveyed depth, higher mean conveying speeds, and greater bulk densities, and these factors combined result in much higher conveying capacity in lbs./hr.

The de-aerating vanes 20 have the additional function which contributes to de-aerating of the materials M of conveyed material, and that is that, because of the wedge-shape as shown and the oscillating or vibrating path 4 of rising and falling of the material during each stroke of the conveyor vibration, the downwardly converging sides of said vanes 20 and of the sides 21 tend to squeeze the mats laterally into a smaller space for thereby squeezing the air or other gases therein by compression. When a very fluffy material such as baking flour, for example, is conveyed in a conveyor having de-aerating vanes 20 and sloping trough sides 21, it will be found, upon stopping the conveyor, that such product for the first foot or so of the conveyor trough length will be so aerated that, when a person closes his eyes and moves his hand toward the product, it will be extremely difficult to determine at what point the product was contacted with the hand. In fact, most persons will first get the sensation of feeling something when they touch the bottom of the trough. However, beyond that point of the conveyor trough, the product will be found to have been so deaerated due to the action aforesaid and to the squeezing out of the air therefrom, that the surface of the mats M are considerably more solid and can be readily felt as a distinct layer on said trough 3. The flow of air or other surrounding gas around the sides of the mats M and the continued squeezing action keeps the product from becoming re-aerated further along the conveyor trough.

Although the cross-section area of the trough 3 equipped with de-aerating vanes 20 is somewhat less than that of a trough not so equipped, it has been found that, in spite of this, the conveying capacity of the present trough is considerably greater than the capacity of the ordinary trough. In actual tests with troughs of the same width operating at the same frequency and amplitude, it has been found that with de-aerating troughs the conveyor conveyed pulverized mica and in a 1½″ deep mat at 60 ft./min., whereas in a parallel-sided trough, the same material conveyed in a ½″ mat at 60 ft./min.

Still another example is pulverized talc which conveyed at 70 ft./min. with a 2¼″ deep mat in a de-aerating trough according to the present invention, and with only a ¾″ deep mat at 60 ft./min. in a parallel-sided trough. It has been further discovered that exploded whole grain cereals, sugar-coated, were conveyed up a 10° slope as a 2″ deep mat at 40 ft./min., and after de-aerating vanes were installed, the same material was conveyed upwardly at the same angle as a 4″ deep mat, and the speed of conveying was increased to 60 ft./min.

With further reference to conveying upward along an inclined trough, it should be mentioned here that the de-aerating vanes 20 may be used on spiral or helical conveyors as well as on the straight pan or trough-type conveyor illustrated herein.

Now in order to make possible the thorough mixing of materials in addition to de-aerating the same, or in lieu of de-aerating the same, the bottom of the conveyor trough 3 is formed with a series of steps 25 thereacross, each of which has horizontal and vertical dimensions 26 and 27 which are respectively less than the horizontal and vertical components of the directional throw of the material along path 4.

Thus, for example, if a conveyor 1 (1″ stroke at 30° upward from horizontal and 470 cycles/min.) conveys at 90 ft./min., then the product on trough 3 moves 2.3″ per stroke $$\left(\frac{90 \times 12}{470}\right)$$

Under these conditions of operation, the portions 29 of the steps 25 should be at 30° from horizontal and the distance 26 should be 2.3″ to achieve maximum conveyed volume of either liquids or of aeratable materials. Thus it will be seen that the distance 26 is always greater than the longitudinal advance of the trough 3 during each stroke. In the example given the stroke or longitudinal advance of the trough is 1″ whereas the distance 26 is 2.3″. Sometimes for mixing it is desired to sacrifice volume and to use smaller steps 25 than indicated. The steps 25 shown in Fig. 3 need not be of saw-tooth form as shown, that is, the portions 28 thereof may be perpendicular, or nearly so, to the portions 29.

It has been found that materials which readily aerate carry on the trough 3 of Fig. 3 to at least a depth twice that of the steps, and within a distance of 3 feet lengthwise of said trough, white powder and black powder are thoroughly mixed or blended. The different materials or different colored materials may be loaded onto the conveyor trough at substantially the same point, or first one material may be loaded and then the other material loaded at some other point longitudinally of the conveyor, and, of course, more than two materials may be mixed or blended.

Figure 4:
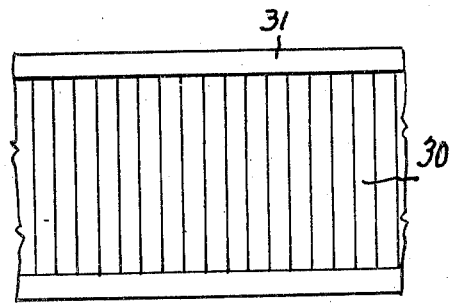
Fig. 4 is a fragmentary top plan view of a conveyor trough without de-aerating vanes.

In Fig. 4, the steps 30 are shown as extending all the way across the conveyor trough 31 without de-aerating vanes 20.

Figure 5:
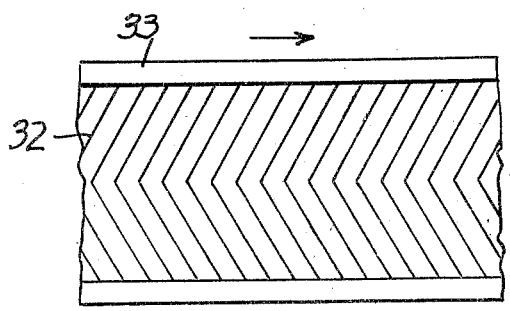
Fig. 5 is a fragmentary top plan view of a modified form of the conveyor trough of Fig. 4.

In Fig. 5, the steps 32 of trough 33 are arranged in herringbone fashion so that, if the different materials are introduced onto the conveyor trough 33 side by side, they will, in addition to being conveyed in direction 34, be urged laterally toward each other to promote thorough mixing.

Other modes of applying the principle of the invention may be employed, change being made as regards the details described, provided the features stated in any of the following claims, or the equivalent of such, be employed.

I therefore particularly point out and distinctly claim as my invention:

1. A device for mixing materials during conveying comprising a conveyor trough having a longitudinally extending material supporting surface, means supporting said conveyor trough for vibration along a path that is upwardly inclined with respect to said trough, drive means for vibrating said trough at a frequency and amplitude effective to progressively toss materials on said trough angularly upward and longitudinally, said material supporting surface comprising a series of steps thereacross, each step consisting of an upwardly inclined portion of inclination generally the same as, but not greater than, that of such inclined path of vibration of said trough and of projected length longitudinally of said trough greater than the longitudinal advance of the trough during each stroke of vibration, whereby said materials are mixed as they are conveyed longitudinally of said trough.

2. The device of claim 1 wherein each step has a downwardly extending portion that is disposed generally transverse to the longitudinal direction of conveying.

3. The device of claim 1 wherein said trough has longitudinally extending upwardly diverging sides for de-aerating the materials as they are conveyed and mixed.

4. The device of claim 3 wherein said trough has at least one longitudinally extending vane projecting upwardly from said material supporting surface to subdivide the materials into relatively narrow mats, said vane having upwardly converging sides which diverge with respect to the sides of said trough for de-aeration of the materials during conveying and mixing.

5. A device for mixing materials during conveying thereof, comprising a directional-throw type vibratory conveyor in which the material-supporting surface thereof has a series of protuberances extending generally crosswise to the direction of conveying and of length not greater than the corresponding component of the advance of the materials during each stroke of vibration of said conveyer, said protuberances being of generally herringbone shape as viewed from above said conveyor to laterally crowd materials loaded onto said conveyor at laterally spaced points thereof to thus promote mixing thereof.

References Cited in the file of this patent

UNITED STATES PATENTS

| | | |
|---|---|---|
| 2,143,610 | Muller et al. | Jan. 10, 1939 |
| 2,222,777 | Linke | Nov. 26, 1940 |
| 2,646,975 | Waldvogel | July 28, 1953 |

FOREIGN PATENTS

| | | |
|---|---|---|
| 676,940 | France | Feb. 28, 1930 |